United States Patent
Watanabe et al.

(10) Patent No.: US 9,529,721 B2
(45) Date of Patent: Dec. 27, 2016

(54) CONTROL DEVICE, AND STORAGE SYSTEM

(71) Applicant: FUJITSU LIMITED, Kawasaki-shi, Kanagawa (JP)

(72) Inventors: Takeshi Watanabe, Kawasaki (JP); Kazuhiko Ikeuchi, Kawasaki (JP); Chikashi Maeda, Kawasaki (JP); Kazuhiro Urata, Kawasaki (JP); Yukari Tsuchiyama, Kawasaki (JP); Norihide Kubota, Kawasaki (JP); Kenji Kobayashi, Kawasaki (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/196,290

(22) Filed: Mar. 4, 2014

(65) Prior Publication Data

US 2014/0289478 A1    Sep. 25, 2014

(30) Foreign Application Priority Data

Mar. 21, 2013  (JP) ................. 2013-058575

(51) Int. Cl.
*G06F 3/00*  (2006.01)
*G06F 13/00*  (2006.01)
(Continued)

(52) U.S. Cl.
CPC ......... *G06F 12/0862* (2013.01); *G06F 3/0611* (2013.01); *G06F 3/0659* (2013.01); *G06F 3/0689* (2013.01); *G06F 2212/6026* (2013.01)

(58) Field of Classification Search
CPC .......... G06F 12/00; G06F 12/02; G06F 12/14; G06F 13/00
(Continued)

(56) References Cited

U.S. PATENT DOCUMENTS 5,694,581 A * 12/1997 Cheng ................... G06F 3/0601
                                                        710/10
5,890,203 A *  3/1999 Aoki ..................... G06F 3/0613
                                                          700/4
(Continued)

FOREIGN PATENT DOCUMENTS

| JP | 2001-125753 | 5/2001 |
| JP | 2007-241927 | 9/2007 |
| JP | 2008-27316  | 2/2008 |

*Primary Examiner* — Ernest Unelus
*Assistant Examiner* — Getente A Yimer
(74) *Attorney, Agent, or Firm* — Staas & Halsey LLP

(57) ABSTRACT

A control device that controls a reading process of information stored in a unit storage area under control of the control device and a unit storage area under control of a different control device in a distributed manner, the control device includes a processor. The processor executes a procedure including determining whether or not the reading process is a sequential reading process that reads information stored in a unit storage area under control of the control device in an order of logical addresses and whether or not a reading target area of the sequential reading process includes a last address in the unit storage area, and reporting to the different control device control information related to a sequential reading process including the last address determined by the first determination unit.

15 Claims, 16 Drawing Sheets

(51) Int. Cl.
*G06F 13/28* (2006.01)
*G06F 12/08* (2016.01)
*G06F 3/06* (2006.01)

(58) Field of Classification Search
USPC ...... 710/8, 5, 11, 15, 30; 711/112, 114, 137, 711/154
See application file for complete search history.

(56) References Cited

U.S. PATENT DOCUMENTS

| | | | | |
|---|---|---|---|---|
| 6,009,275 | A * | 12/1999 | DeKoning | G06F 9/5011 710/113 |
| 6,546,459 | B2 * | 4/2003 | Rust | G06F 3/0619 710/39 |
| 7,360,038 | B2 * | 4/2008 | Onabe | G06F 3/061 710/11 |
| 7,653,783 | B2 * | 1/2010 | Byrne | G06F 11/1076 710/52 |
| 2007/0214325 | A1 * | 9/2007 | Sasamoto | G06F 12/0862 711/137 |
| 2008/0282031 | A1 * | 11/2008 | Tanoue | G06F 3/0611 711/114 |

\* cited by examiner

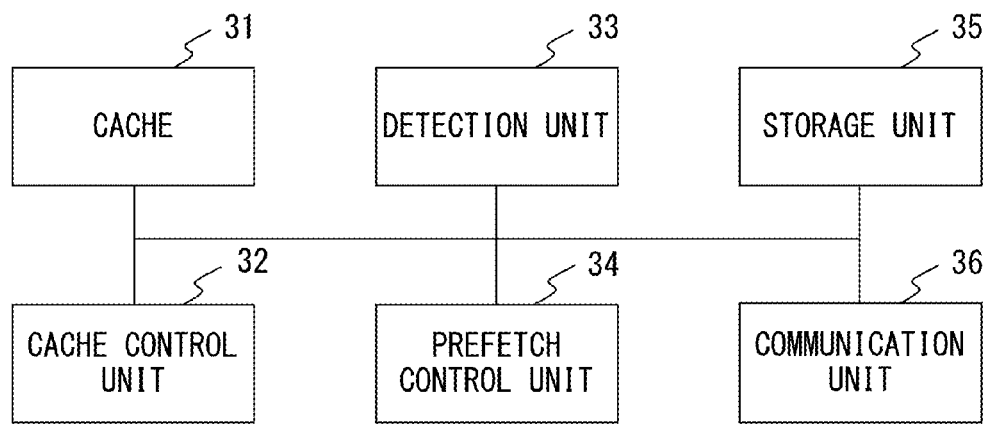
F I G. 4

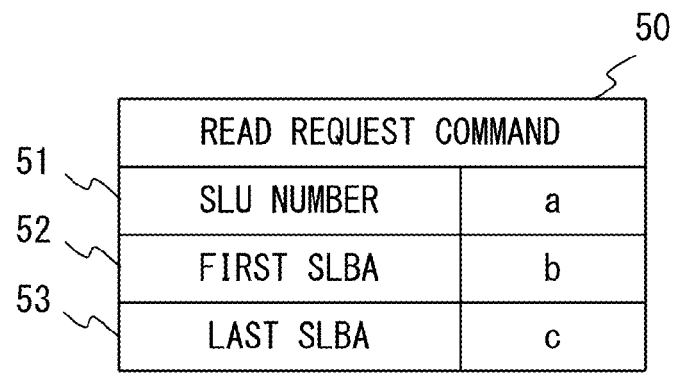
F I G. 6

| DATA ITEM | VALUE |
|---|---|
| SLU NUMBER | A |
| FIRST SLBA | B |
| LAST SLBA | C |
| NUMBER OF TIMES OF DETECTION | D |
| TIME STAMP | E |

FIG. 8

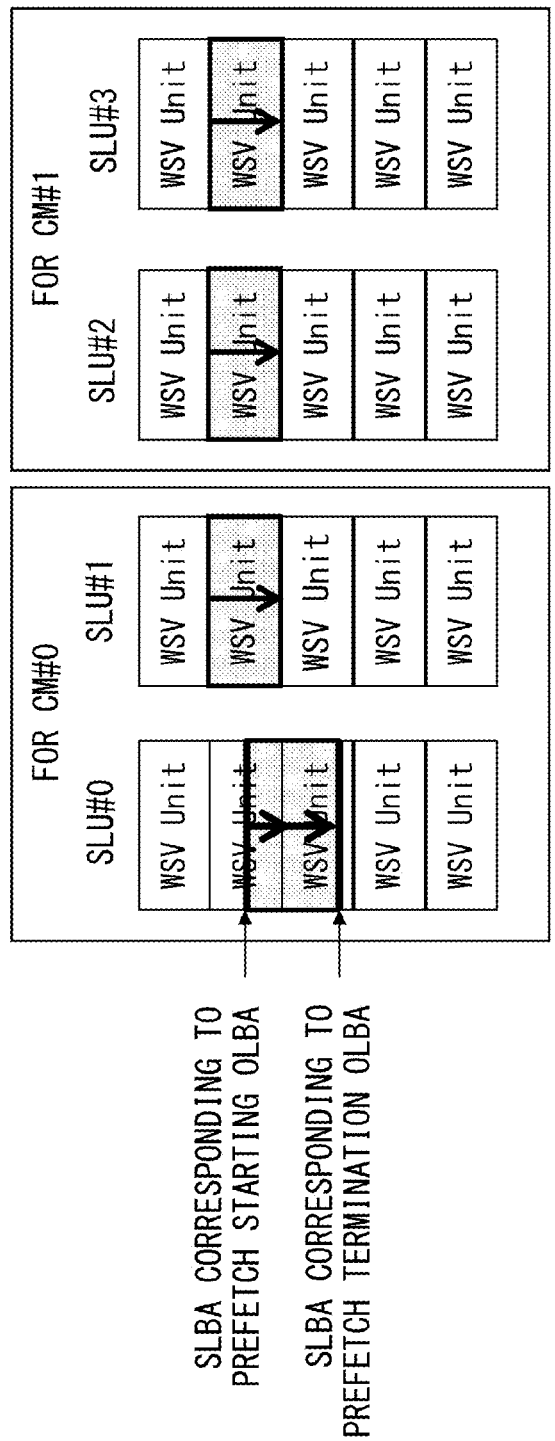
F I G. 12

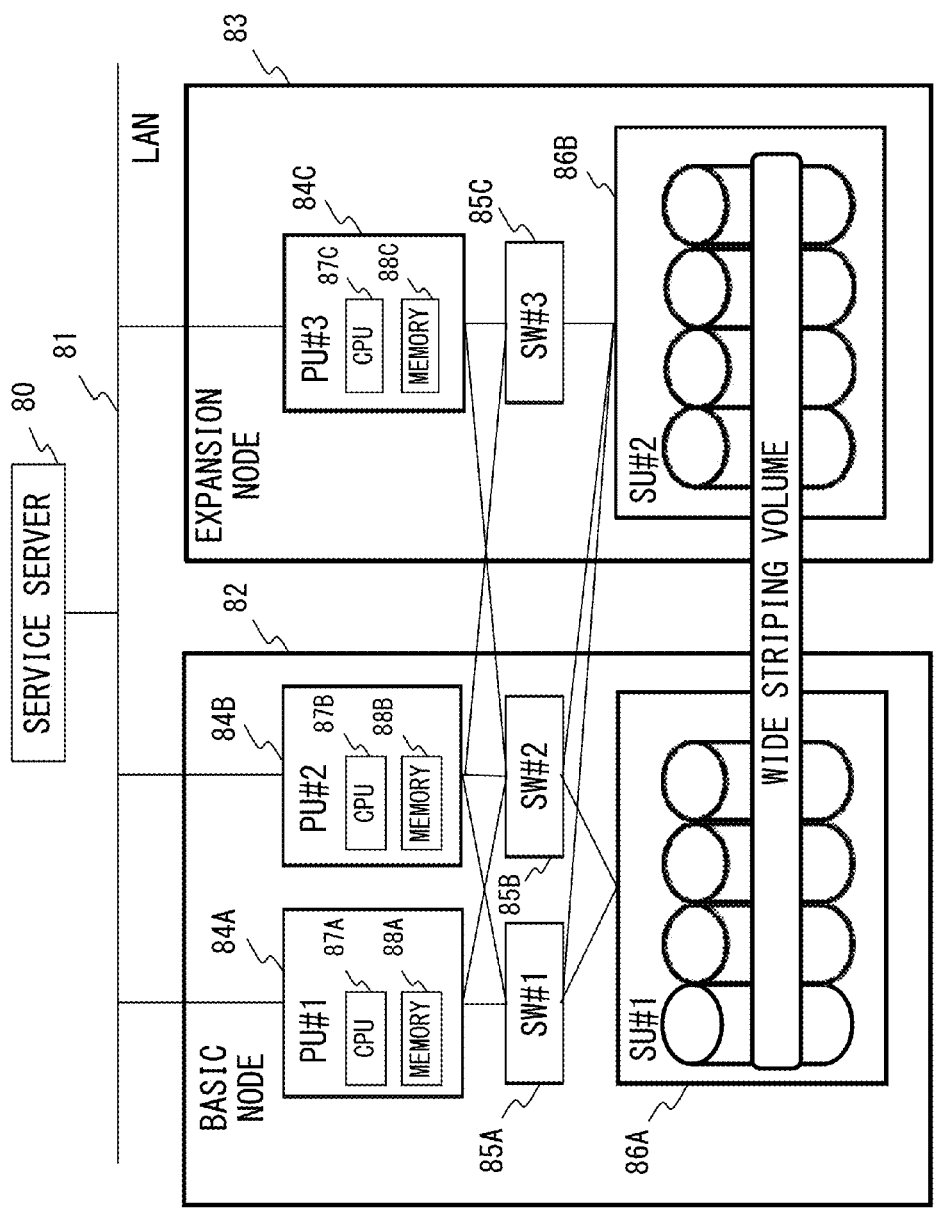
F I G. 16

CONTROL DEVICE, AND STORAGE SYSTEM

CROSS-REFERENCE TO RELATED APPLICATION

This application is based upon and claims the benefit of priority of the prior Japanese Patent Application No. 2013-058575, filed on Mar. 21, 2013, the entire contents of which are incorporated herein by reference.

FIELD

The embodiments discussed herein are related to control of a storage system.

BACKGROUND

There is a technique that virtually provides a logical storage area obtained by combining physical storage devices instead of providing a physical storage device directly to a computer in a storage system. As a specific virtualization function for a storage system, there is a RAID (Redundant Array of Independent Disks) function, which combines a plurality of physical storage devices in a system so as to realize redundancy and higher speeds.

Also, a group of a plurality of physical storage devices on a prescribed RAID level is referred to as a RAID group, and a plurality of RAID groups are combined and a logical storage area is virtually provided so as to increase the expandability of the storage volume of a storage system. In a storage system such as that described above, a wide striping function, which distributes logical volumes to a plurality of RAID groups, is known. By using this wide striping function, input/output (I/O) loads are distributed to respective RAID groups, and thereby the performance of random I/O can be improved.

In a storage system that implements a wide striping function, when separate control modules control a plurality of RAID groups respectively, access paths, cache memories, and the like for the RAID groups can be distributed, making it possible to improve the I/O performance.

However, it is difficult to control all logical volumes as one unit because I/O is controlled with respect to logical volumes (referred to as WSV hereinafter) that have received wide striping for each independent control module. In particular, when logical volumes are read sequentially, accesses are made through a plurality of different control modules and thus it is not possible to prefetch a WSV across a plurality of RAID groups and it is difficult to improve the I/O performance for reading.

There is a technique that provides functions as described below to a disk array device in which a connection port for a host device has a plurality of paths so as to improve the throughput even when I/Os are requested by a plurality of different ports. The functions are an internal cache search function, which performs a search in order to check whether data to be accessed is stored in an internal cache memory, and an external cache search function, which performs a search via a data path in order to check whether data to be accessed is stored in an external cache memory.

Techniques described in the documents below are known.
Patent Document 1: Japanese Laid-open Patent Publication No. 2008-27316
Patent Document 2: Japanese Laid-open Patent Publication No. 2001-125753
Patent Document 3: Japanese Laid-open Patent Publication No. 2007-241927

SUMMARY

According to an aspect of the embodiment, a control device that controls a reading process of information stored in a unit storage area under control of the control device and a unit storage area under control of a different control device in a distributed manner, the control device includes a processor. The processor executes a procedure including determining whether or not the reading process is a sequential reading process that reads information stored in a unit storage area under control of the control device in an order of logical addresses and whether or not a reading target area of the sequential reading process includes a last address in the unit storage area, and reporting to the different control device control information related to a sequential reading process including the last address determined by the first determination unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a configuration of a CM of the storage device according to the first embodiment;

FIG. 6 illustrates a data configuration of a divisional read request command;

FIG. 8 illustrates an example of a detection table;

FIG. 12 illustrates an example in which a prefetch target area includes an SLU managed by a CM other than the CM itself;

FIG. 16 illustrates an example of a hardware configuration of a storage device according to the third embodiment.

DESCRIPTION OF EMBODIMENTS

Figure 1:
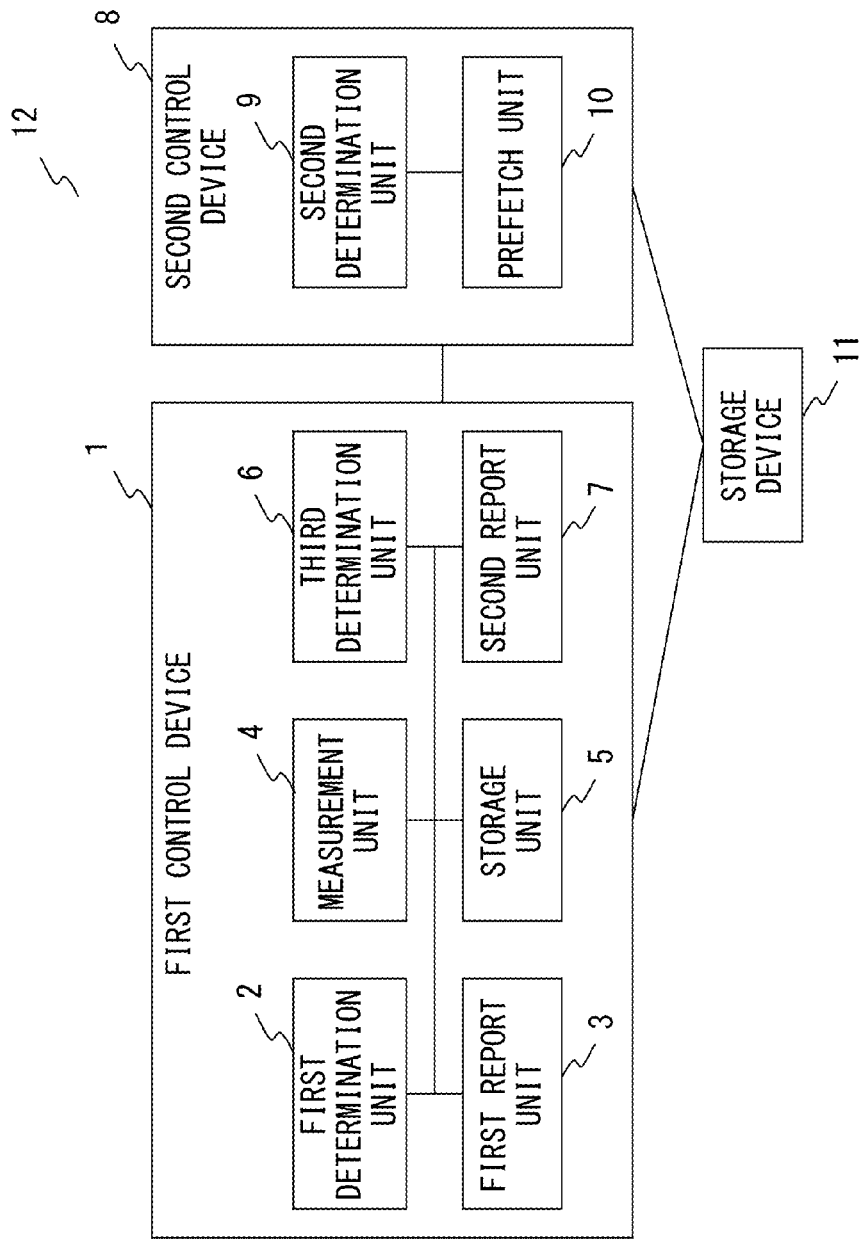
FIG. 1 is an example of a functional block diagram of a storage system.

FIG. 1 illustrates an example of a functional block diagram of a storage system. A storage system 12 includes a first control device 1, a second control device 8, and a storage device 11.

The first control device 1 includes a first determination unit 2, a first report unit 3, a measurement unit 4, a storage unit 5, a third determination unit 6, and a second report unit 7.

The first determination unit 2 determines whether or not a reading process is a sequential reading process in which pieces of information stored in unit storage areas under control of the control device itself are read in the order of logical addresses and the reading target area of the sequential reading process includes the last address in the unit storage area.

The first report unit 3 reports, to a different control device, control information related to a sequential reading process including the last address determined by the first determination unit 2. Also, the first report unit 3 reports, to a different control device, the number of times of when the reading target of the reading process includes the last address in the unit storage area under control of the control device itself.

The measurement unit 4 measures the number of times of reading in the order of logical addresses in the sequential reading process.

The storage unit 5 stores the amount of information to be read by prefetch.

The third determination unit 6 determines, on the basis of the amount of information stored in the storage unit 5, whether or not the prefetch target area to be read by prefetch includes a unit storage area under control of a different control device.

The second report unit 7 reports prefetch information related to a unit storage area under control of a different control device to the different control device when it is determined that the prefetch target area includes a unit storage area under control of a different control device.

The second control device 8 includes a second determination unit 9 and a prefetch unit 10.

The second determination unit 9 determines, on the basis of control information reported from a different control device, whether or not the reading process of a unit storage area of the control device itself and the reading process of the control device as the reporting source are sequential reading processes.

The prefetch unit 10 performs prefetch in which information in a unit storage area under control of the control device itself related to the sequential reading process determined by the second determination unit 9 is read beforehand so as to store the information in a cache memory. Also, the prefetch unit 10 performs prefetch when the value obtained by adding the number of times of being reported to the number of times of reading in the order of logical addresses in the control device itself is equal to or greater than a prescribed threshold. Also, when prefetch information has been reported from a different control device, the prefetch unit 10 on the basis of the reported prefetch information, performs prefetch of information in the unit storage area corresponding to the prefetch information.

In the storage device 11, pieces of divisional information, which is information obtained by dividing prescribed information into prescribed units, are stored in a distributed manner, and each of the plurality of storage devices 11 stores divisional information in a unit storage area.

(Embodiment 1)

Figure 2:
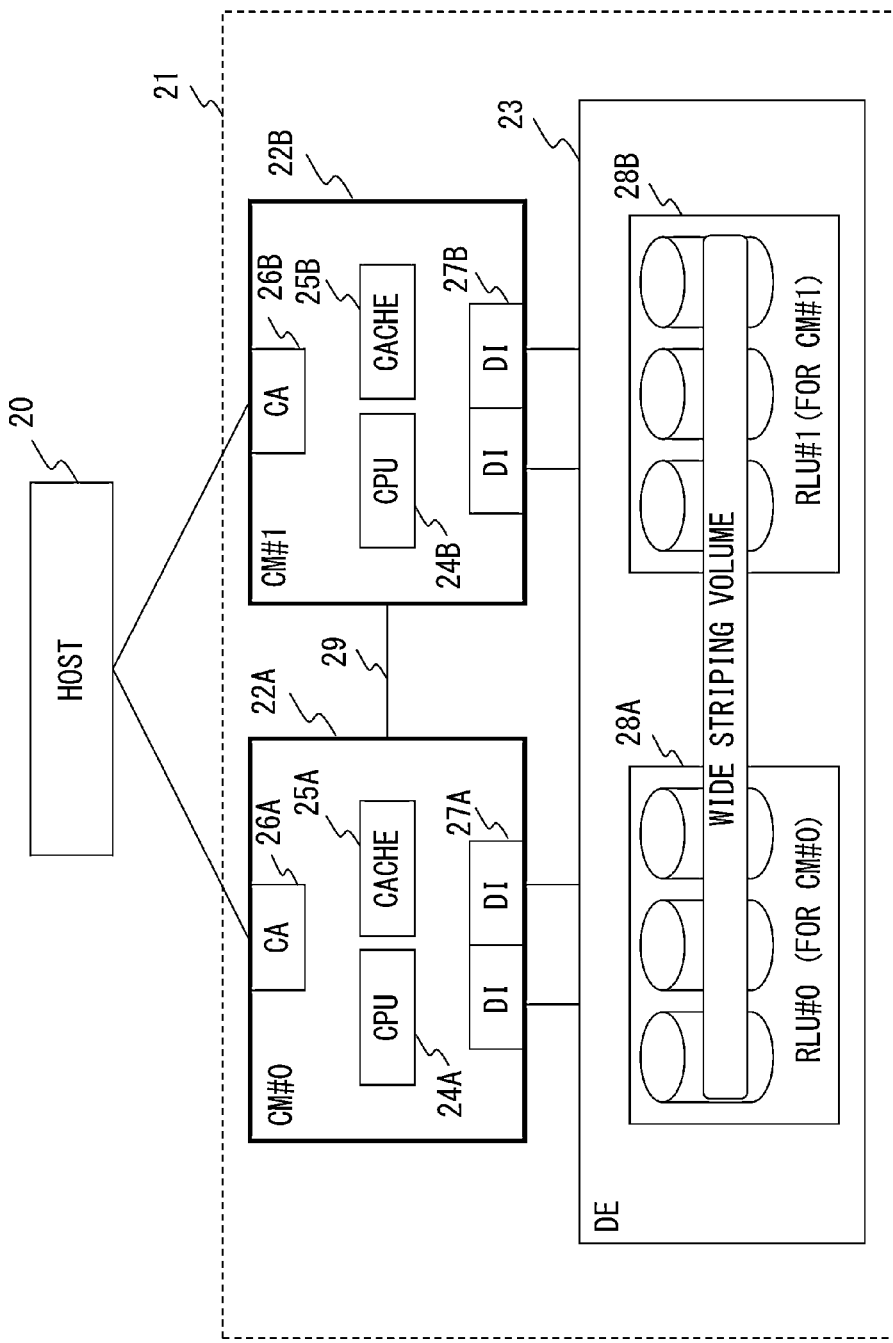
FIG. 2 illustrates an example of a hardware configuration of a storage device according to the first embodiment.

FIG. 2 illustrates an example of a hardware configuration of a storage device according to a first embodiment.

A storage device 21 includes a plurality of disks, is constituted, a RAID that can treat those disks as one logical volume.

The storage device 21 includes a controller module #0 (referred to as a CM#0 hereinafter) (CM 22A), a controller module #1 (referred to as a CM#1 hereinafter) (CM22B), and a device enclosure (referred to as a DE hereinafter) (DE 23). Also, the storage device 21 is connected to a host 20 via, for example, a network.

The CM#0 and the CM#1 perform various kinds of control in a storage system, and perform access control on the DE 23 in accordance with an I/O command transmitted from the host 20. The CM#0 and the CM#1 are connected to different storage devices in the DE 23. Also, the CM#0 and the CM#1 are connected, via for example routers, through a bus 29 such as PCI Express or the like or a network. Note that although there are two CMs in the example illustrated in the figure, more CMs may be connected.

The CM#0 includes a Central Processing Unit (CPU) 24A, a cache memory 25A, a CA (channel Adapter) 26A, and DIS (Disk Interface) 27A. Hereinafter, a cache memory is referred to as a "cache".

The CM#1 includes a CPU 24B, a cache 25B, a CA 26B, and DIS 27B.

In the explanations below, when CM22A and CM22B are not discriminated, they are referred to as a CM22. Similarly, when there are no discriminations between the CPUs 24A and 24B, between the cache 25A and the cache 25B, between the CAs 26A and 26B, and between the DIs 27A and 27B, they are referred to as the CPU 24, the cache 25, the CA 26, and the DI 27.

The CPU 24 is an arithmetic device that performs various kinds of arithmetic and control by executing a program, and implements various types of functions by executing a program stored in a memory or a ROM (not illustrated).

The cache 25 is a storage area used for improving transfer efficiency when information stored in the DE 23 is transferred to the host 20.

The CA 26 is an adapter for the connection with the host 20.

The DI 27 is an interface that is arranged in the CM 22 and that is connected to the DE 23.

The DE 23 is an enclosure including a plurality of disks. The DE 23 is connected to the DI 27 of the CM#0 and the CM#1 through a bus or the like. FIG. 2 illustrates two routes to connect the DE 23 and the CMs 22, however, the number of routes is not limited to this. Further, various relay devices may be provided between the DE 23 and the DI 27. Also, the DE 23 may include not only disks but also various storage devices.

A plurality of disks in the DE 23 constitute a disk group. One disk group includes a plurality of disks. A disk group such as this is referred to as an RLU (RAID Group Logical Unit).

In the case illustrated in FIG. 2, an RLU#0 (RLU 28A) is managed by the CM#0, and an RLU#1 (RLU 28B) is managed by the CM#1. Note that the number of RLUs is not limited to two.

An Open Volume Logical Unit (OLU) recognized by the host 20 includes areas of the RLU#0 and the RLU#1. Data stored in this logical volume receives striping across the RLU#0 and the RLU#1 and is stored.

Herein, a logical volume that receives striping across a plurality of RLUs is referred to as a Wide Striping Volume (WSV). Also, striping across RLUs is referred to as wide striping.

In wide striping, an area of a WSV is divided for each prescribed data amount and divisional areas are assigned to a plurality of RLUs in a prescribed order and in a distributed manner. Data of a prescribed data amount obtained by dividing is referred to as a WSV unit, and the size of data of a WSV unit is referred to as a WSV unit size.

Also, an area of a prescribed size of an RLU is referred to as an SLU (Shared Logical Unit).

One of those RLUs that constitute a wide striping volume is set as a representative RLU of the WSV. Also, an RLU number, which is a unique identification number, is assigned to each RLU. A representative RLU is an RLU that functions as a starting point when WSV units are assigned to a plurality of RLUs in a prescribed order and in a distributed manner. When WSV units are assigned to respective RLUs, the first WSV unit is assigned to the representative RLU. The second and subsequent WSV units are assigned to RLUs in, for example, the ascending order of RLU numbers, and when WSV units have been assigned to all RLUs, the next WSV unit is assigned to the first RLU (representative RLU) again.

Figure 3:
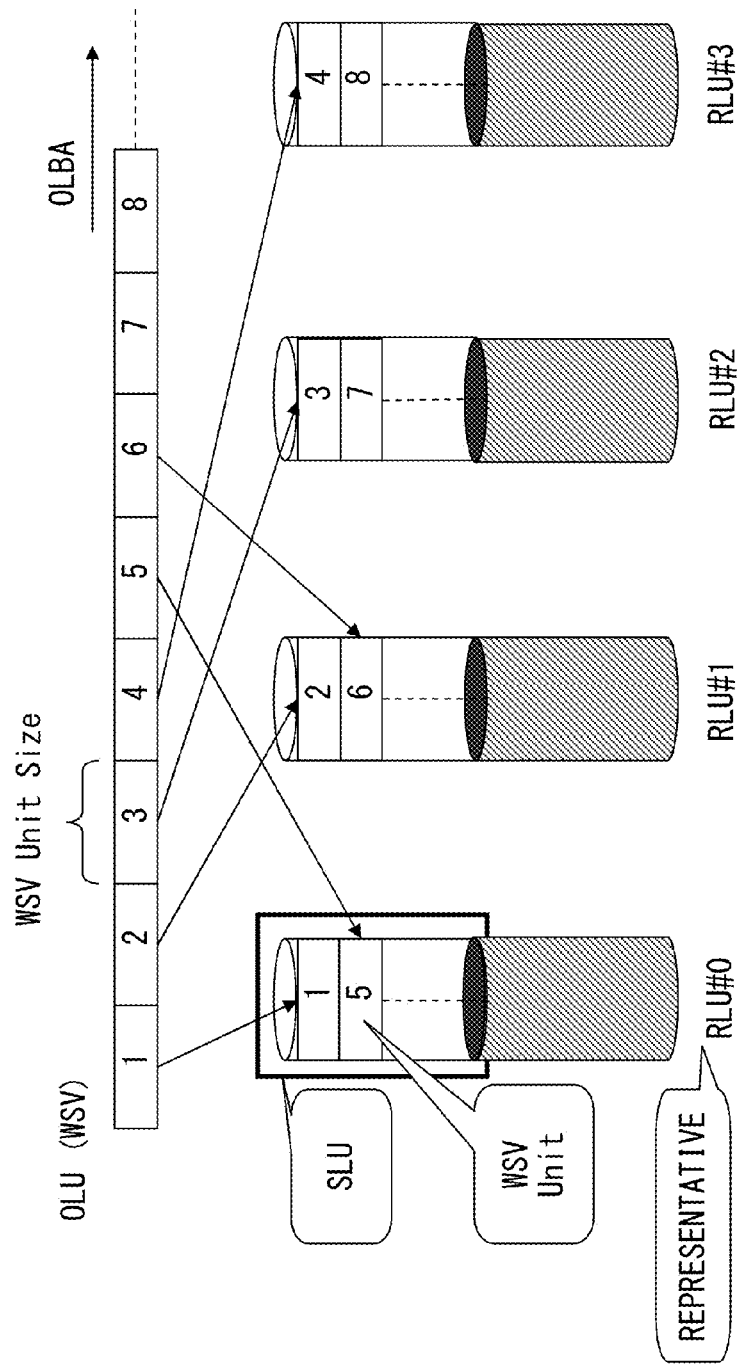
FIG. 3 illustrates wide striping.

FIG. 3 explains wide striping.

In the example illustrated in FIG. 3, a plurality of RLUs including a plurality of disks are configured (RLU#0, RLU#1, RLU#2, RLU#3). The RLU#0 is set as the representative RLU of the WSV. The OLU is a logical volume recognized by the host 20. In the OLU illustrated in FIG. 3, striping is performed across a plurality of RLUs that are managed by different CMs 22. Therefore, it is also possible to have recognition that this OLU is a wide striping volume (WSV). As illustrated in FIG. 3, each of the areas of WSVs divided for a prescribed data amount is a WSV unit, and the areas are assigned to a plurality of RLUs in a prescribed order and in a distributed manner. Also, an SLU is an area of a prescribed size of an RLU, and an SLU includes a plurality of WSV units. In FIG. 3, the area of WSV unit "1", which is the first WSV unit, is assigned to area "1" of RLU#0, which is the representative RLU. Then, the area of the next WSV unit "2" is assigned to the area of "2" of RLU#1, and the area of WSV unit "3" is assigned to the area of "3" of the RLU#2.

Each RLU may constitute a different RAID level. Also, the host 20 is, for example, a server.

FIG. 4 illustrates a configuration of the CM 22 of the storage device 21 according to the first embodiment. The CM 22 includes a cache 31, a cache control unit 32, a detection unit 33, a prefetch control unit 34, a storage unit 35, and a communication unit 36. The cache control unit 32 is an example of the prefetch unit 10. The detection unit 33 is an example of the first determination unit 2, the first report unit 3, the measurement unit 4, and the second determination unit 9. The prefetch control unit 34 is an example of the third determination unit 6 and the second report unit 7. The storage unit 35 is an example of the storage unit 5.

The cache 31 is a storage area used for improving the efficiency of transferring data stored in the disk of the DE 23 to the host 20 when a read request is made by the host 20. The cache 31 corresponds to the cache 25 illustrated in FIG. 2.

When a read request is made by the host 20, the cache control unit 32 first determines whether or not reading target data exists in the cache 31, and when it does, the cache control unit 32 returns the data in the cache 31 to the host 20. When it does not exist in cache 31, the cache control unit 32 reads out the reading target data from the disk to the cache 31 and returns the reading target data to the host 20. Also, when a write request is made by the host 20, the cache control unit 32 first determines whether or not writing target data exists in the cache 31, and when it does, the cache control unit 32 rewrites the data in the cache 31. When it does not exist, the cache control unit 32 reads out the writing target data from the disk to the cache 31, and writes the reading out target data. The data in the cache 31 that has received a writing process may be written to the disk immediately after the writing process was performed on the data in the cache 31 and also may be written to the disk at a prescribed timing.

When sequentiality is detected in read requests made by the host 20, the cache control unit 32 prefetches data in a storage device having sequential addresses of logical volumes to the cache 31 beforehand without waiting for a subsequent read request. This prefetching operation is referred to as prefetch staging. By performing prefetch staging, it is possible to improve the throughput of sequential read requests (READ I/O) from the host 20. The cache control unit 32 receives from the prefetch control unit 34 timing for performing a read operation of prefetch staging and information of the address of a target area to be prefetched. The function of the cache control unit 32 is provided by the CPU 24.

The detection unit 33 detects sequentiality in read requests made by the host 20 and instructs the prefetch control unit 34 to perform prefetch staging. Specifically, when read requests having sequential logical clock addresses as reading targets have continued for a number of times equal to or greater than a threshold, the detection unit 33 instructs the prefetch control unit 34 to execute prefetch staging. Thereby, it is possible to detect sequentiality across SLUs and controllers for read requests for WSVs. The function of the detection unit 33 is provided by the CPU 24.

When the prefetch control unit 34 has received an execution instruction of prefetch staging from the detection unit 33, it calculates a target area of the prefetch staging. Then, the prefetch control unit 34 transmits, together with information of the calculated target area, to the cache control unit 32 a report that instructs the execution of prefetch staging to be performed. Also, when the target area of the prefetch staging includes an SLU managed by the different CMs 22, the prefetch control unit 34 instructs, via the communication unit 36, the prefetch control unit 34 of the different CMs 22 to perform prefetch on that target area. The function of the prefetch control unit 34 is provided by the CPU 24.

The storage unit 35 stores a detection table used by the detection unit 33 for detecting sequentiality. Also, it stores information representing which of WSV units constituting an OLU are assigned to the RLUs 28 and information of an address of a boundary of respective WSV units (referred to as a WSV unit boundary hereinafter). In this example, information representing which of WSV units constituting an OLU are assigned to the RLUs 28 includes information of the order of assigning WSV units to RLU units and CM information that manages the RLUs 28. Because information representing which WSV units constituting an OLU are assigned to of the RLUs 28 and the address of a boundary of the respective WSV units can be calculated from, for example, a list of RLUs constituting a WSV, a representative RLU, and a WSV unit size, these pieces of information may be stored. Also, the storage unit 35 stores information of the prefetch amount in prefetch staging.

The function of the storage unit 35 is provided by a semiconductor memory such as a Random Access Memory (RAM), a Read Only Memory (ROM), a flash memory, etc., although this is not illustrated in FIG. 2.

The communication unit 36 transmits and receives information, to and from different CMs 22, related to the detection of sequentiality in order to detect sequentiality of the entire logical volume across WSV units managed by the respective CMs 22. Also, the communication unit 36 transmits information and receives information of the prefetch target area to and from the different CMs 22 when the area to be prefetched includes an SLU managed by the CM 22 other than the CM itself in the prefetch staging.

Figure 5:
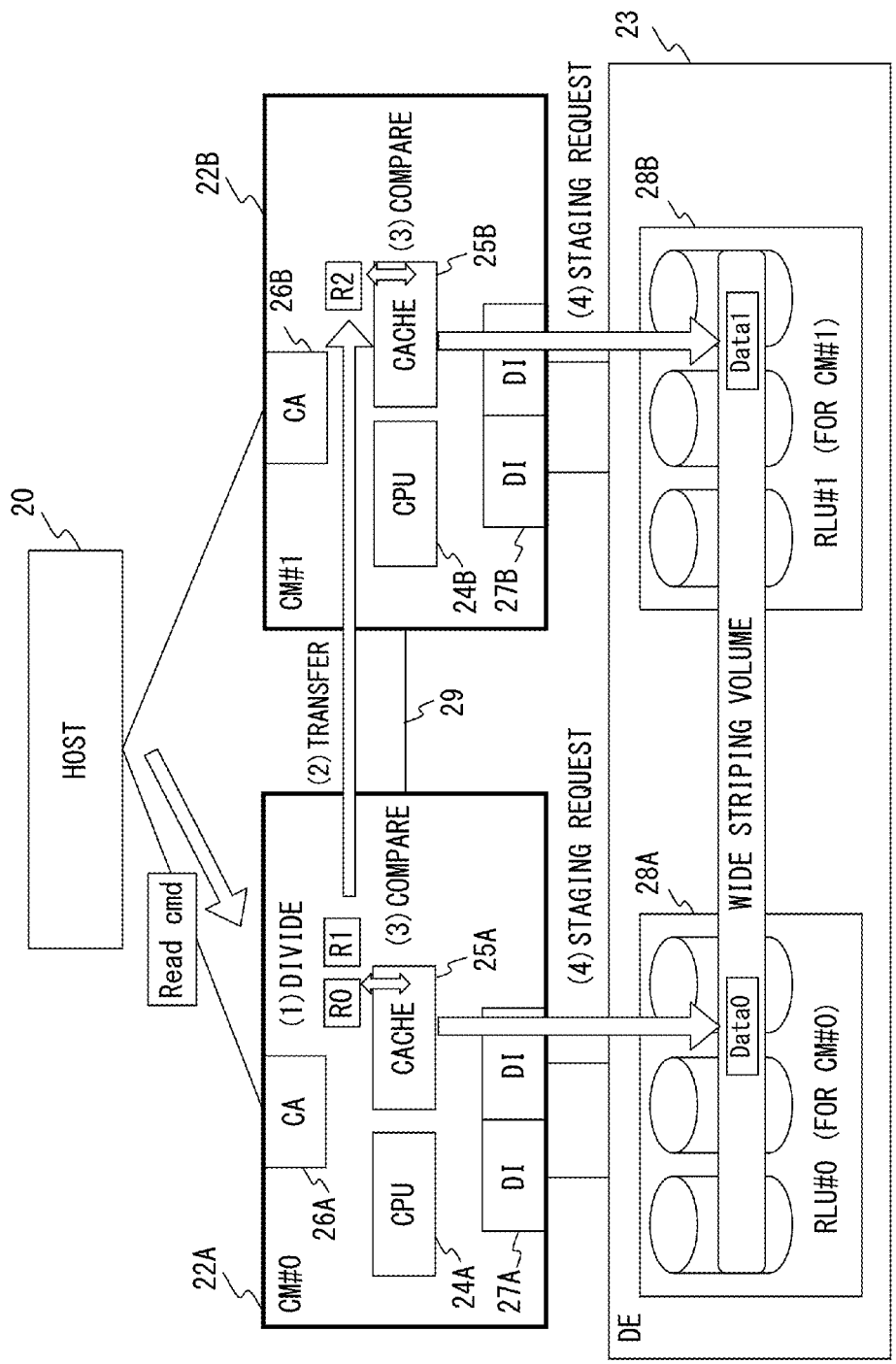
FIG. 5 explains operations before a start of staging when a read request to a storage device executing wide striping has been received.

Next, explanations will be given for operations of the storage device for a case when a read request from the host 20 has been made. FIG. 5 and FIG. 6 illustrate operations for a case when the storage device 21 executing wide striping has received a read request.

First, by referring to FIG. 5, explanations will be given for operations before the start of staging when the storage device 21 executing wide striping has received a read request.

When a read request command issued from the host 20 has been received, the CM#0 refers to a reading target area described in the received read request. Then, the CM#0 determines which of the RLUs 28 the reading target area is located in. The CM#0 generates a read request command for each reading target area managed by the different CMs 22 when the reading target area in the received read request includes an address of the RLU 28 other than the RLUs managed by the CM#0 (1). In the example illustrated in FIG. 5, the CM#0 generates read request commands R0 and R1. R0 is a read command whose reading target is an area in an SLU of the RLU 28A managed by the CM#0 from among target addresses of a read request command. R1 is a read command whose reading target is an area in an SLU of the RLU 28B managed by CM#1.

An example of a data structure included in a divisional read request command is illustrated. FIG. 6 illustrates an example of a data structure of a generated divisional read request command. A read request command 50 includes an "SLU number" 51, a "first SLBA" 52, and a "last SLBA" 53.

The "SLU number" 51 represents identification information of an SLU that is a reading target of the read request command 50. The "first SLBA" 52 and the "last SLBA" 53 respectively represent the addresses of the first SLBA and the last SLBA of the reading target area of the SLU represented by an SLU number stored in the "SLU number" 51. In the example in FIG. 6, "a", "b", and "c" are stored as examples of the values of the "SLU number" 51, the "first SLBA" 52, and the "last SLBA" 53, respectively.

When a reading target address of a read request command is described as a logical address of the OLU, the CM#0 may convert the address into a physical address by using an address conversion table or the like.

Next, the CM#0 transfers R1 to the CM#1 by inter-CM communication (2).

Next, the CM#0 and the CM#1 determine whether or not the reading target data of R0 or R1 exists in the cache 25A and the cache 25B (3). When the reading target data does not exist in the caches 25A and 25B, the CM#0 and the CM#1 performs determination of sequentiality on R0 or R1 so as to start prefetch staging when sequentiality has been detected.

When sequentiality has not been detected, the CM#0 and the CM#1 start reading the reading target data from the physical address of the RLU to the cache (4).

Figure 7:
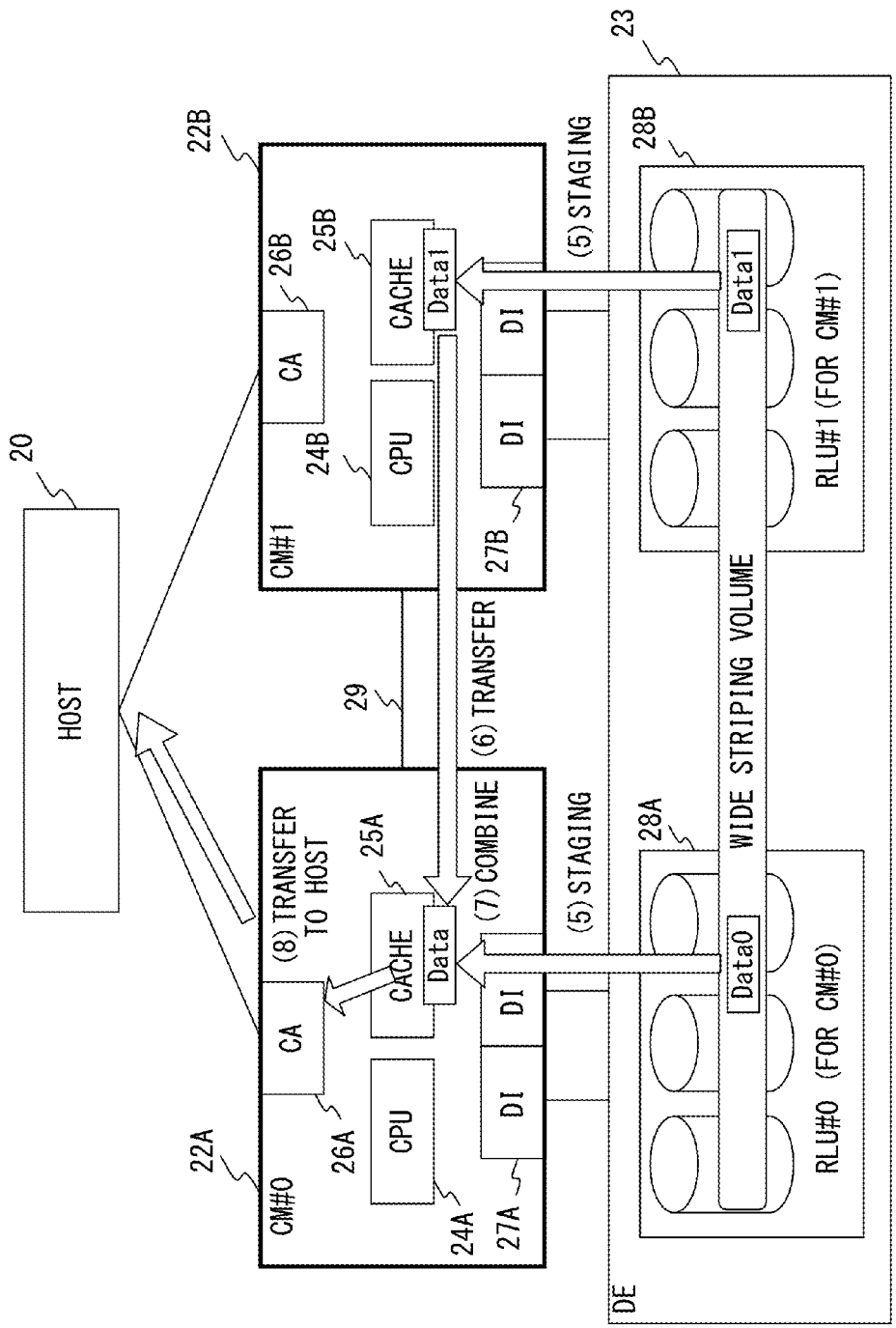
FIG. 7 explains operations from a start of staging to making a response to a host when a read request to a storage device executing wide striping has been issued.

Next, explanations will be given for operations from the start of staging when a read request is issued to a storage device that is executing wide striping to a response to the host 20 by referring to FIG. 7.

The CM#0 reads Data0, which is data stored in the read area of R0, to the cache 25A. The CM#1 reads Data1, which is data stored in the read area of R1, to the cache 25B (5). The processes of (3) through (5) are executed by the CM#0 and the CM#1 parallelly.

Next, the CM#1 transfers Data1 of the cache 25B to the cache 25A of the CM#0 through the bus 29 (6).

Next, the CM#0 combines Data0 and Data1 and generates data requested by the host 20 (7). Then, the CM#0 transfers the generated Data to the host 20 (8).

The processes of dividing and combining read request commands are performed by the CPU 24 of the CM 22. In the explanations below, explanations will be given in accordance with an assumption that a read request command requested by the detection unit 33 is a divisional read request command after the dividing was performed.

Next, detailed explanations will be given for a detection operation of sequentiality in a storage device that is executing wide striping.

The storage unit 35 holds a detection table used for detecting sequentiality in such a manner that the table is associated with each SLU. FIG. 8 illustrates an example of a detection table. A detection table 40 includes data items of an "SLU number" 41, a "first SLBA (SLU Logical Block Address)" 42, a "last SLBA" 43, a "number of times of detection" 44, and a "time stamp" 45.

In the "SLU number" 41 identification information of a corresponding SLU is stored. The "first SLBA" 42 represents the value of the first SLBA of a reading target area of a read request. The "last SLBA" 43 represents the value of an SLBA that has become the access target in the latest read request. In the "number of times of detection" 44 a value representing how many times read requests having sequential logical block addresses of reading targets continued in the latest case is stored. In the "time stamp" 45 information representing a date and time of updating a detection table is stored.

The storage unit 35 holds the plurality of detection tables 40 that correspond to one SLU, and the CM 22 can detect as many sequential read requests of multi levels as the number of the detection tables 40 corresponding to one SLU. In this example, it is assumed that the maximum value of the number of the detection tables 40 corresponding to one SLU is M.

When many read requests were made to one SLU from the host 20 in parallel, the detection unit 33 uses one of the detection tables 40 for each read request in order to detect sequentiality. When a new read request occurs in a case where the number of the detection tables 40 has reached maximum value M, the detection unit 33 deletes the detection table 40 that is not currently being used and that has the oldest "time stamp" 45, and generates the detection table 40 as a new table.

When the detection unit 33 has received a read request from the host 20, it searches for the detection table 40 having the value of the last SLBA 43 that is sequential to the first SLBA of the read request from the host 20. Then, the detection unit 33 increments the value of the number of times of detection 44 in the detection table 40 detected as a result of the search. When the value of the number of times of detection 44 has exceeded a prescribed threshold after the increment, the detection unit 33 determines that sequentiality for the read request from the host 20 was detected.

When the detection unit 33 has detected sequentiality, it instructs the prefetch control unit 34 to execute prefetch staging. When the prefetch control unit 34 has received an execution instruction of prefetch staging, it calculates a prefetch target area. Specifically, the prefetch control unit 34 calculates, as a prefetch target area, the area that stores data of the prefetch data amount having sequential addresses in the OLBA from the next address in the OLBA corresponding to the last SLBA 43 in the detection table 40. In this example, the information of the prefetch data amount is stored in the storage unit 35. Then, the prefetch control unit 34 transmits to the cache control unit 32 an execution instruction of prefetch staging together with information of the prefetch target area. When the cache control unit 32 has received the execution instruction of prefetch staging from the prefetch control unit 34, it reads data stored in the prefetch target area to the cache 25.

Figure 9:
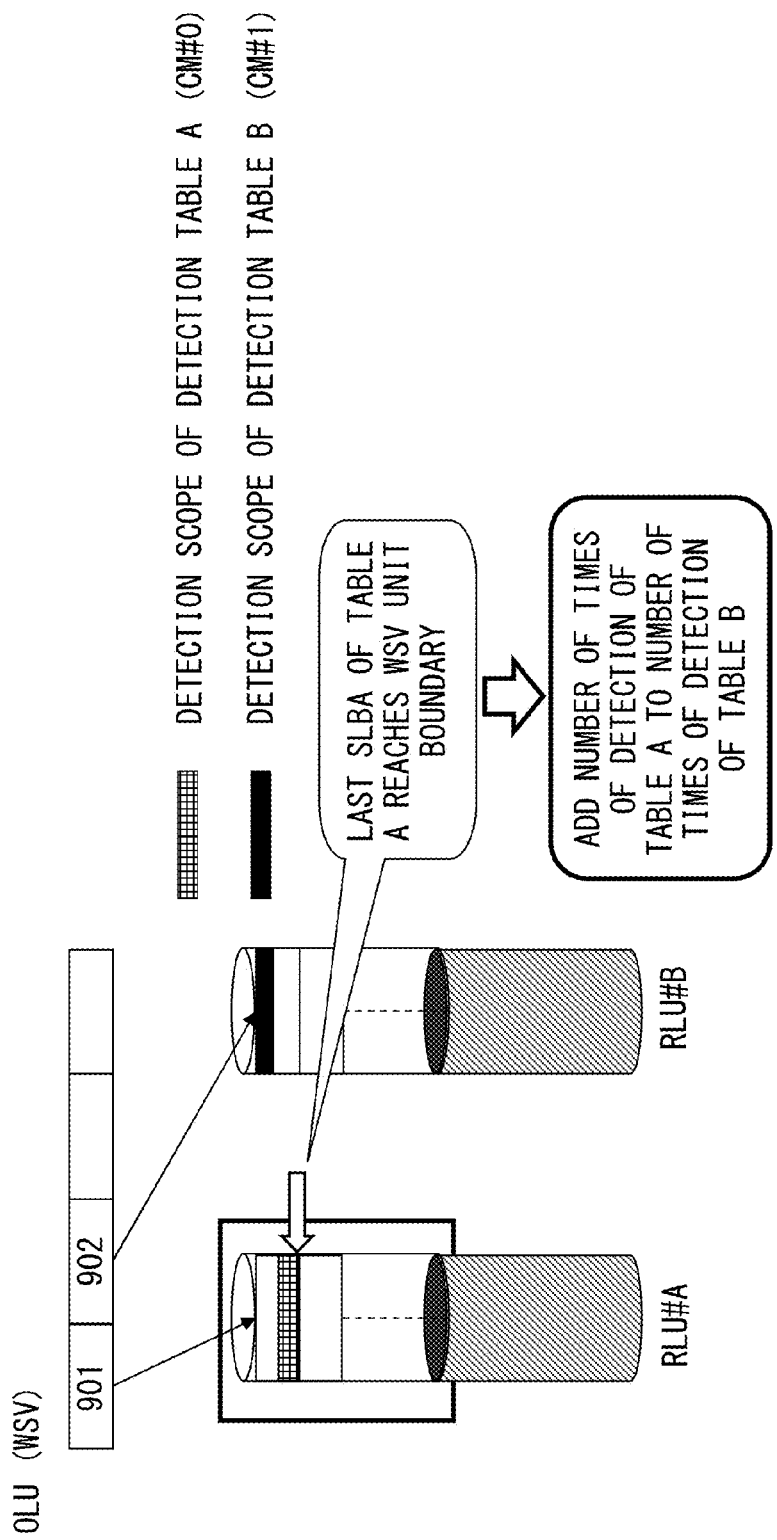
FIG. 9 explains taking over of the number of times of detection when a reading target area includes a WSV unit boundary.

When the target area of a read request includes a WSV unit boundary, the detection unit 33 reports the number of times of detection to the CM 22 that manages the next WSV unit, and the detection unit 33 of the CM 22 that received the report takes over the number of times of detection. Thereby, it is possible to detect sequentiality as the entire logical volume across WSV units managed by the respective CMs 22. However, when the CM 22 that manages the next WSV unit is the CM 22 itself, it is not necessary to report it. FIG. 9 explains the taking over of the number of times of detection when a reading target area includes a WSV unit boundary.

In the example illustrated in FIG. 9, a WSV unit 901 is included in RLU#A while the WSV unit 902 is included in RLU#B. The CM 22 that manages RLU#A is CM#0 while the CM 22 that manages RLU#B is CM#1.

When the read request for the WSV unit 901 has reached the WSV unit boundary, the detection unit 33 of CM#0 reports the value of the number of times of detection 44 and the value of the last SLBA 43 in the detection table 40 to CM#1 that manages the RLU#B including the next WSV unit.

CM#1 holds the plurality of detection tables 40 for respective read requests that are not related to each other regarding sequentiality, and accordingly determines the detection table 40 that corresponds to a read request related to a reported value. Specifically, the detection unit 33 of CM#1 searches for and extracts a table, from among the detection tables 40 held by the CM 22 of the detection unit 33, in which the OLBA corresponding to the value of the first SLBA 42 is the OLBA next to the OLBA corresponding to the reported last SLBA 43. Then, the detection unit 33 of CM#1 adds the value of the number of times of detection 44 reported from CM#0 to the number of times of detection 44 of the extracted detection table 40. Then, the detection unit 33 of CM#1 determines that sequentiality has been detected for a read request from the host 20 when the value of the number of times of detection 44 has exceeded a prescribed threshold.

Figure 10:
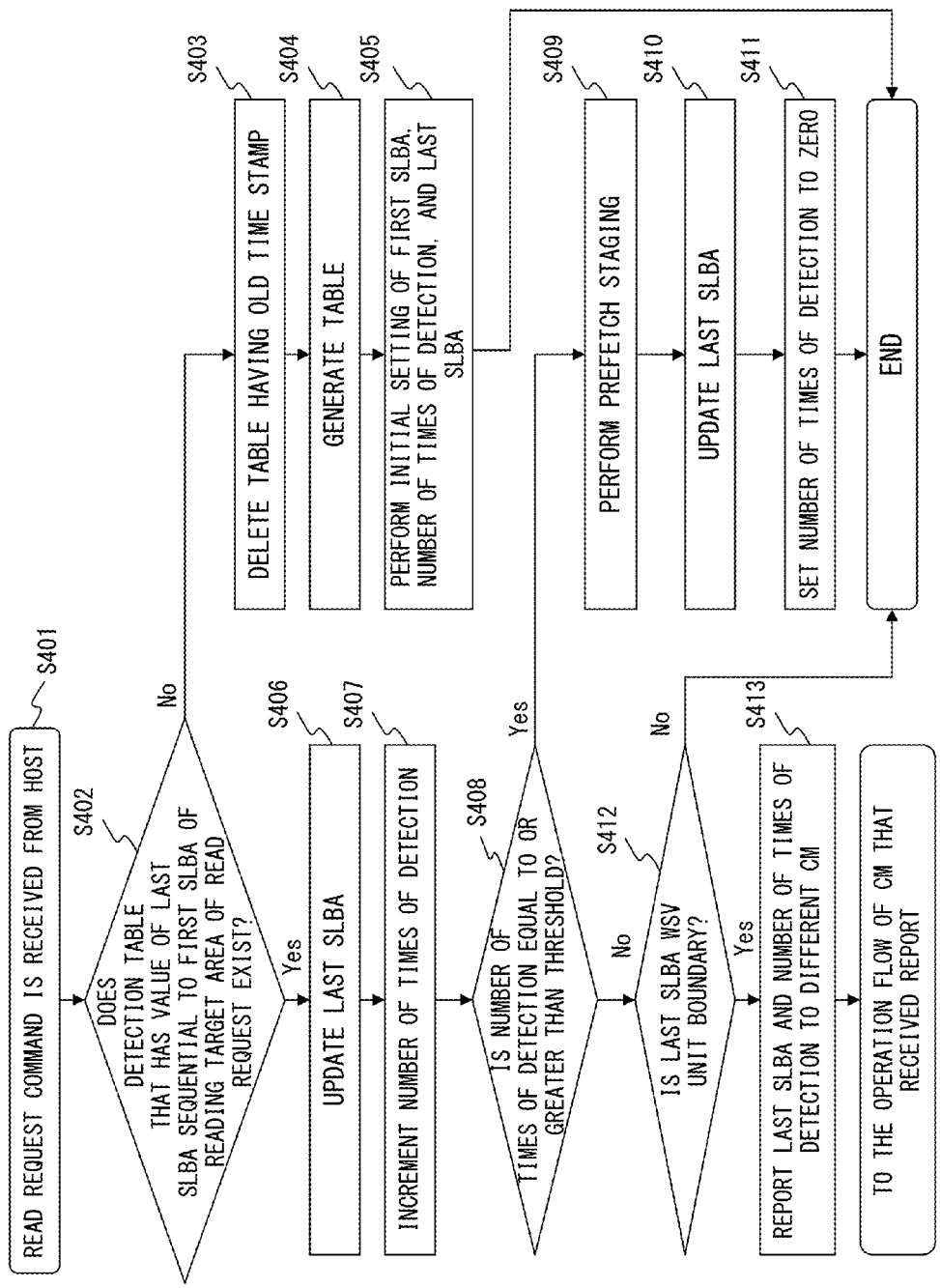
FIG. 10 illustrates an operation flow of detection of sequentiality and prefetch staging of a CM.

Next, explanations will be given for an operation flow of the detection of sequentiality and prefetch staging. FIG. 10 illustrates an operation flow of the detection of sequentiality and prefetch staging of the CM 22. The flow in FIG. 10 is started when each CM has received a divisional read request that has been divided for each CM.

When the detection unit 33 has received a read request command (S401), it searches for the detection table 40 that has the value of the last SLBA 43 sequential to the first SLBA of the reading target area of the read request (S402).

When the detection table 40 having the value of the last SLBA 43 sequential to the first SLBA of the reading target area does not exist (NO in s402), the detection unit 33 deletes the detection table 40 having the oldest time stamp 45 (S403).

Then, the detection unit 33 newly generates the detection table 40 related to a received read request (S404). Also, the detection unit 33 stores a generation time of the detection table 40 in the time stamp 45 in the detection table 40.

Next, the detection unit 33 sets initial values of the first SLBA 42, the last SLBA 43, and the number of times of detection 44 of the detection table 40 generated in s404 (S405). Specifically, the detection unit 33 stores the first SLBA of the reading target area of the received read request in the first SLBA 42 in the detection table 40, and stores the last SLBA of the reading target area in the last SLBA 43. Also, the detection unit 33 sets "0" as the value of the number of times of detection 44 in the detection table 40. Thereafter, the process terminates.

When the detection table 40 that meets the conditions is detected as a result of the search in s402 (YES in s402), the detection unit 33 updates the value of the last SLBA 43 of the detected table to the last SLBA of the reading target area (S406). Also, the detection unit 33 updates the value of the time stamp 45 in the detection table 40 to the time at which the last SLBA 43 was updated.

Next, the detection unit 33 increments the value of the number of times of detection 44 in the detection table 40 (S407).

Next, the detection unit 33 determines whether or not the value of the number of times of detection 44 in the detection table 40 is equal to or greater than a prescribed threshold (S408).

When it has been determined that the value is equal to or greater than a prescribed threshold (YES in s408), the detection unit 33 determines that sequentiality was detected and transmits a report instructing the prefetch control unit 34 to execute prefetch staging. When the prefetch control unit 34 has received the report, it calculates the prefetch target area and transmits the execution instruction of prefetch and information of the prefetch target area. When the cache control unit 32 has received the prefetch execution instruction and the information of the prefetch target area, it executes prefetch (S409).

Next, the detection unit 33 updates the value of the last SLBA 43 in the detection table 40 to the value of the last SLBA of the data prefetched in s409 (S410).

Then, the detection unit 33 sets the value of the number of times of detection 44 in the detection table 40 to zero (S411). Thereafter, the process is terminated.

When it has been determined that the value of the number of times of detection 44 is smaller than a prescribed value in s408 (NO in s408), the detection unit 33 determines whether or not the value of the last SLBA 43 has reached the WSV unit boundary (S412). For example, the detection unit 33 determines whether or not the last SLBA 43 is the WSV unit boundary.

When it has been determined that the value of the last SLBA 43 has not reached the WSV unit boundary (NO in s412), the process is terminated.

When it has been determined that the value of the last LBA 43 has reached the WSV unit boundary in s412 (YES in s412), the detection unit 33 transmits the last SLBA 43 and the number of times of detection 44 to the different CMs 22 as a number of times of detection report (S413). The different CMs 22 to which the report is transmitted by the detection unit 33 is the CM 22 that manages the RLU 28 corresponding to the address next to the address in the OLBA that corresponds to the last SLBA. The detection unit 33 refers to information indicating which of the RLUs 28 is assigned to a WSV unit constituting the OLU stored in the storage unit 35, and determines the CM. 22 to which the report is to be transmitted. Note that the detection unit 33 transmits a number of times of detection report to the different CMs 22 via the communication unit 36.

Then, the process proceeds to the process executed by the CM 22 that received the report.

Figure 11:
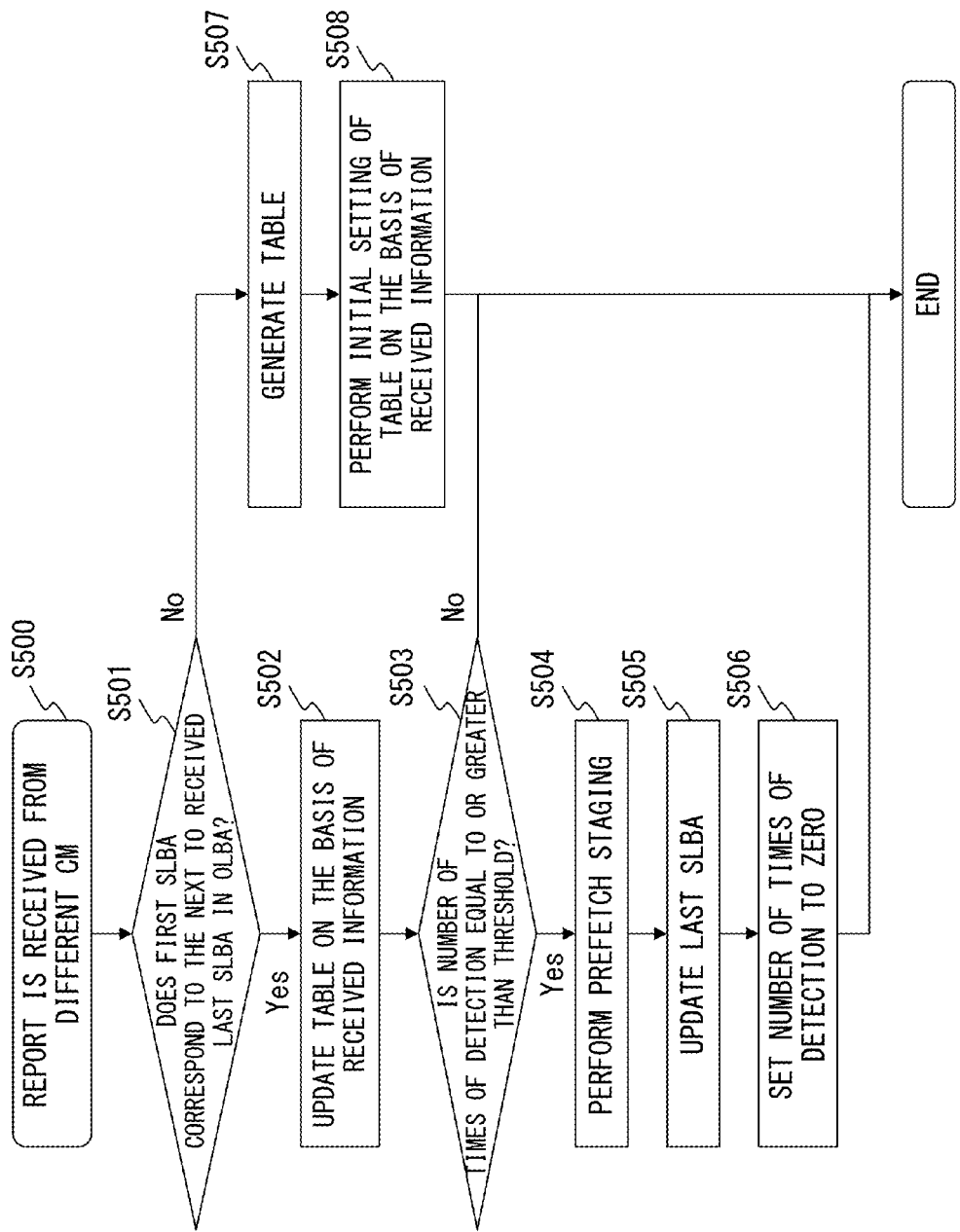
FIG. 11 illustrates an operation flow of a CM that received the number of times of detection report.

Next, explanations will be given for operations of the CM 22 that received the number of times of detection report issued in s413. FIG. 11 illustrates an operation flow of the CM 22 that received a number of times of detection report.

When the detection unit 33 has received the number of times of detection report (S500), it searches, from among the detection tables 40 held by the CM 22 itself, for a table in which the OLBA corresponding to the value of the first SLBA 42 is the OLBA next to the OLBA corresponding to the reported last SLBA 43 (S501). In this example, the detection table 40 extracted by the search is referred to as a detection table 40b.

When the detection table 40b is extracted in s501 (YES in s501), the detection unit 33 updates the information of the detection table 40b in accordance with the number of times of detection report (S502). Specifically, the detection unit 33 adds the value of the number of times of detection 44 of the number of times of detection report to the number of times of detection 44 in the detection table 40b.

Next, the detection unit 33 determines whether or not the value of the number of times of detection 44 in the detection table 40b is equal to or greater than a prescribed threshold (S503). When the value is smaller than a prescribed value (NO in s503), the process is terminated.

When it has been determined that the value is equal to or greater than a prescribed threshold (YES in s503), the detection unit 33 determines that sequentiality was detected, and transmits a report instructing the prefetch control unit 34 to execute prefetch staging. When the prefetch control unit 34 has received the report, it calculates the prefetch target area, and transmits the execution instruction of prefetch and information of the prefetch target area to the cache control unit 32. When the cache control unit 32 has received the prefetch execution instruction and the information of the prefetch target area, it executes prefetch staging (S504).

Next, the detection unit 33 updates the value of the last SLBA 43 in the detection table 40b to the value of the last SLBA of the data prefetched in s504 (S505).

Then, the detection unit 33 sets the value of the number of times of detection 44 in the detection table 40b to zero (S506). Thereafter, the process is terminated.

When a table in which the OLBA corresponding to the value of the first SLBA 42 is the OLBA next to the OLBA corresponding to the reported last SLBA 43 was not detected in s501, the detection unit 33 newly generates the detection table 40 (S507).

Then, the detection unit initially sets the value of the number of times of detection 44 in the detection table 40 generated in the s507 to the value of the number of times of detection 44 in the number of times of detection report (S508). Then, the process is terminated.

In some cases, a prefetch target area includes an SLU managed by the CM 22 other than the CM itself depending upon the address at which prefetch is started or upon the prefetch amount in prefetch staging. Operations in such a case will be explained.

FIG. 12 illustrates an example in which a prefetch target area includes an SLU managed by the CM 22 other than the CM itself.

In the example illustrated in FIG. 12, data writing is performed in WSV units in the order of SLU#0, SLU#1, SLU#2, SLU#3, SLU#0, SLU#1, . . . in the wide striping. In the example illustrated in FIG. 12, the shaded portions represent prefetch target areas of the prefetch staging, and include SLUs managed by the CM 22 other than the CM itself. In other words, the prefetch target area starts from the SLBA corresponding to the prefetch starting OLBA in SLU#0 to the SLBA corresponding to the prefetch termination OLBA in the WSV unit next to the SLU#0 via SLU#1, SLU#2, and SLU#3.

When sequentiality has been detected and an execution report of prefetch staging has been received from the detection unit 33, the prefetch control unit 34 calculates the target area of the prefetch staging. When the target area of the prefetch staging includes an SLU managed by the different CMs 22, the prefetch control unit 34 instructs the different CMs 22 to perform prefetch on the target area. The instruction of the prefetch staging given to the different CMs 22 includes information of the address of the prefetch target area of the prefetch staging to be performed by the instructing CM 22. In the example illustrated in FIG. 12, the prefetch control unit 34 of CM#0 instructs the CM#1 managing SLU#2 and SLU#3 to perform staging of the data in the shaded portions.

Figure 13:
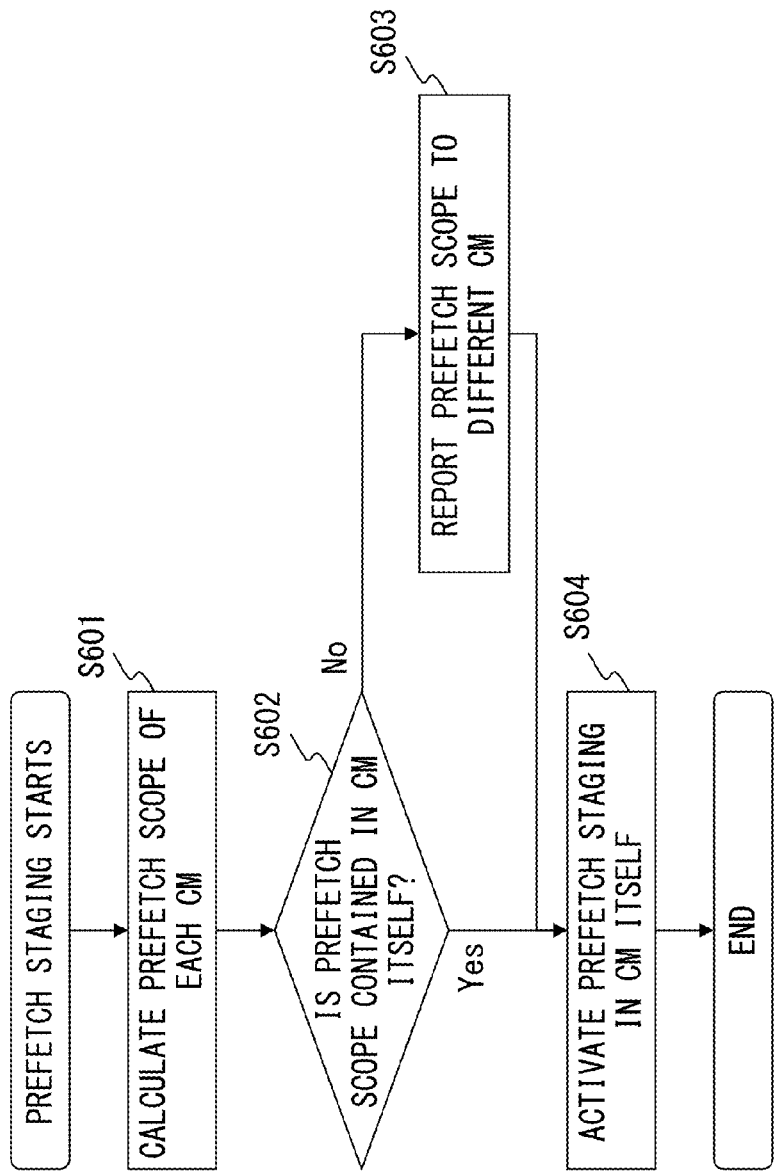
FIG. 13 illustrates an operation flow of a storage device performed when an area to be prefetched includes an SLU managed by a CM other than the CM itself in prefetch staging.

Next, explanations will be given for an operation flow when an area to be prefetched includes an SLU managed by the CM 22 other than the CM itself. FIG. 13 illustrates an operation flow of a storage device when an area to be prefetched includes an SLU managed by the CM 22 other than the CM itself in prefetch staging.

When sequentiality has been detected and an execution report of prefetch has been received from the detection unit 33, the prefetch control unit 34 first calculates the target area of the prefetch staging (prefetch scope) (S601). Specifically, the prefetch control unit 34 obtains the prefetch amount stored in the storage unit 35. Also, the prefetch control unit 34 obtains the value of the last SLBA 43 in the detection table 40. Then, the prefetch control unit 34 calculates, as a prefetch target area, the area from the address next to the OLBA corresponding to the value of the last SLBA 43 to the address of the OLBA in the scope of the prefetch amount.

Next, the prefetch control unit 34 determines whether or not the RLU 28 included in the CM 22 itself fully contains the prefetch target area (prefetch scope) (S602). Specifically, the prefetch control unit 34 determines whether or not the prefetch target area exists across the WSV unit boundary with a WSV unit managed by the different CMs 22. When it has been determined that an RLU managed by the CM 22 itself fully contains the prefetch target area (YES in s602), the process proceeds to s604.

When it has been determined that an RLU managed by the CM 22 itself does not fully contain the prefetch target area (NO in s602), the prefetch control unit 34 reports the prefetch target area to the different CMs 22 that manage an SLU, including the prefetch target area (S603). Specifically, the prefetch control unit 34 refers to information, stored in the storage unit 35, representing which of the RLUs 28 are assigned to WSV units constituting the OLU and information representing the address of the boundary of each WSV unit. Then, the prefetch control unit 34 obtains the first SLBA of the prefetch area and the prefetch data amount for each SLU on the basis of the prefetch target area in the OLBA. Then, the prefetch control unit 34 transmits, to the CM 22 managing each SLU, information of the prefetch first SLBA and the prefetch data amount that correspond to the SLU, as prefetch target area report.

Then, the prefetch control unit 34 performs prefetch on the prefetch target area in the RLU in the CM 22 itself (S604), and the process is terminated.

Figure 14:
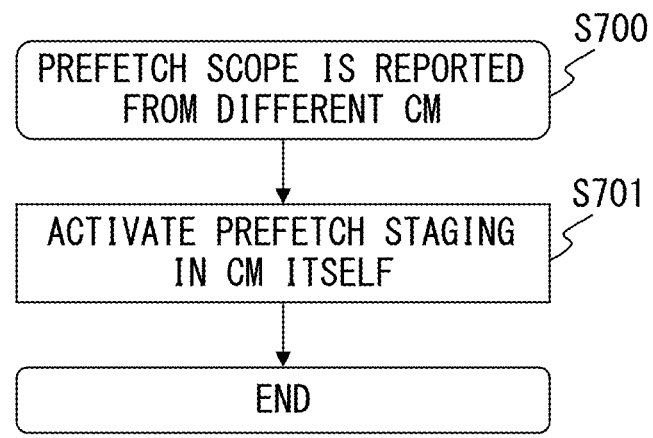
FIG. 14 illustrates an operation flow of a storage device performed when a prefetch target area report has been received.

Next, explanations will be given for operations of the CM 22 that received the prefetch target area report issued in s603. FIG. 14 illustrates an operation of a storage device performed when a prefetch target area report has been received.

When a prefetch target area (prefetch scope) report has been received (S700), the prefetch control unit 34 determines a prefetch target area on the basis of the prefetch first SLBA and the prefetch data amount included in the received report. The prefetch control unit 34 instructs the cache control unit 32 to perform prefetch staging on the data in the prefetch target area, and the cache control unit 32 performs prefetch staging (S701). Then, the process is terminated.

In the present embodiment, data arrangement of WSVs is taken into consideration so that the plurality of independent CMs 22 in combination can perform prefetch staging while minimizing exchanges of data between the CMs. A detection table for detecting prefetch staging is stored independently in each of the CMs 22. Only when the last LBA in a detection table exceeds a WSV unit boundary, the CM 22 communicates table information to the different CMs 22, thereby communications between CMs can be minimized.

Also, the CM 22 determines whether or not the target scope of the prefetch staging is across to a different CM, and when it does, the CM 22 reports to the different CM the area of the prefetch to be executed by the different CM so as to permit prefetch staging over different CMs.

(Embodiment 2)

Figure 15:
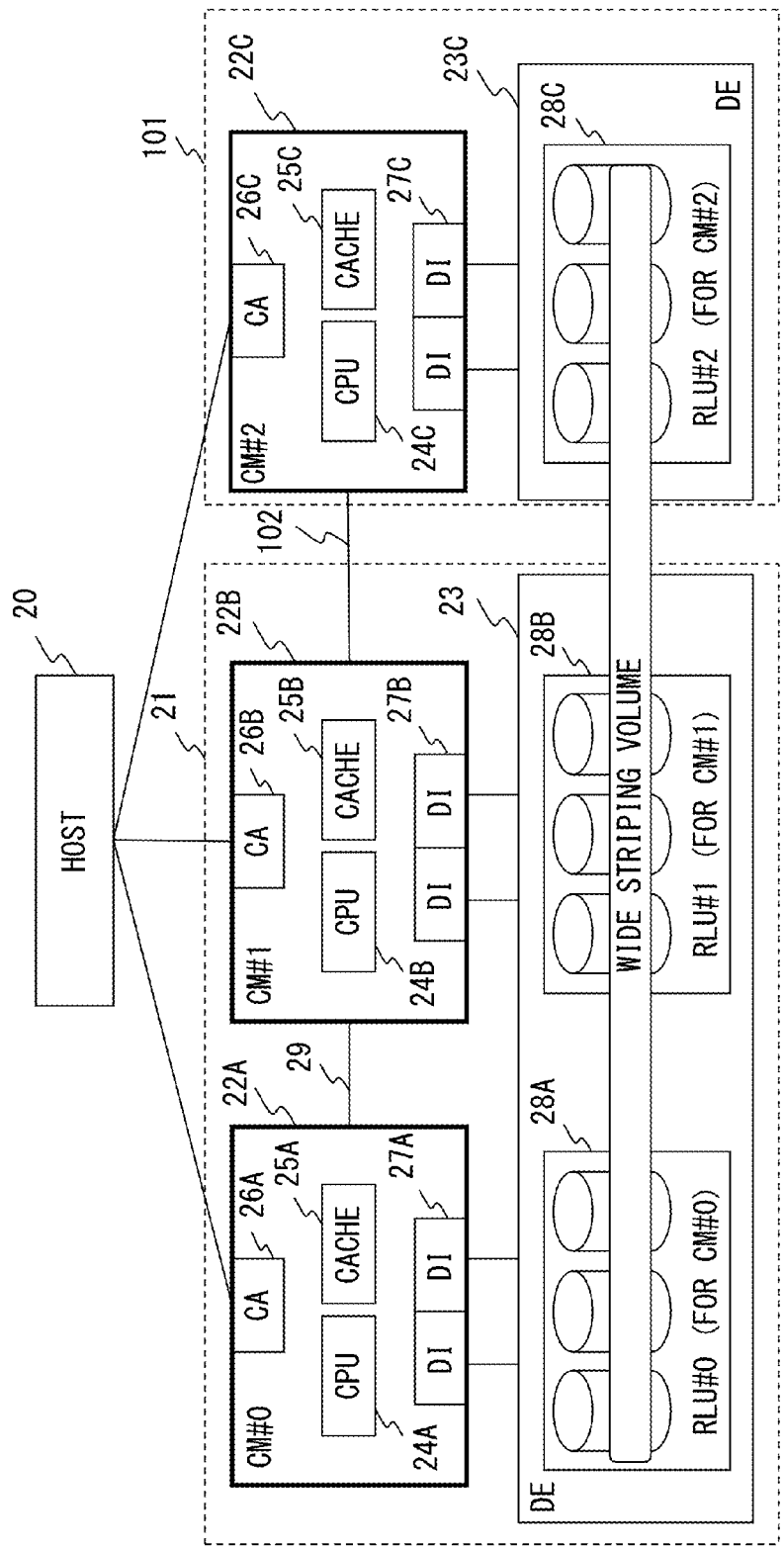
FIG. 15 illustrates an example of a hardware configuration of a storage device according to the second embodiment.

The storage system according to embodiment 2 employs a configuration in which the storage devices 21 according to embodiment 1 are connected between housings. FIG. 15 illustrates an example of a hardware configuration of a storage system according to embodiment 2.

The storage system according to embodiment 2 employs a configuration in which the storage device 21 and a storage device 101 are connected through a bus or the network 102. The storage device 21 and the storage device 101 may be connected via a switch or a router.

The storage device 21 is similar to what was explained in embodiment 1. The storage device 101 employs a configuration in which one CM 22 and one DE 23 are included; however, the scope of the invention is not limited to this, and a plurality of CMs 22 and DEs 23 may be included. The respective functions of a CM 22C and a DE 23C correspond to those of the CM 22 and the DE 23 explained in embodiment 1. An RLU 28A, an RLU 28B, and an RLU 28C constitute a wide striping volume.

(Embodiment 3)

In a storage system according to embodiment 3, some of the functions of the CM 22 in embodiment 1 are implemented by a processor unit (referred to as a PU hereinafter) such as a server. FIG. 16 illustrates an example of a hardware configuration of the storage system according to embodiment 3.

The storage system according to embodiment 3 includes a basic node 82 and an expansion node 83. The basic node 82 includes a PU#1 (84A), a PU#2 (84B), a switch (referred to as an SW hereinafter) #1 (SA 85A), an SW#2 (SW 85B), and a storage unit (referred to as an SU hereinafter) #1 (SU 85A). The expansion node 83 includes a PU#3 (PU 84C), an SW#3 (SW 85C), and an SU#2 (SU 86B). The basic node 82 and the expansion node 83 are connected to a host computer such as a service server 80 through, for example, a network such as a LAN (Local Area Network) 81 or the like. Also, the PU#1, the PU#2, the PU#3, the SU#1, and SU#2 are connected through a bus or a network via the SW#1 and SW#2 so that data is transmitted and received. It is possible to access each PU 84 and each SU 86 via a switch.

In the explanations below, the PU 84A, the PU 84B, and PU 84C are referred to as the PU 84 when they are not discriminated. This applies to the SWs, the SUs, CPUs, and memories.

The PU 84 includes a CPU 87 and a memory 88.

The CPU 87 performs control of I/O in relation to a disk of the SU 86 from the service server 80. The CPU 87 controls various operations of the PU 84 and the SU 86. Also, the CPU 87 manages WSVs configured in areas of disks of the SU 86A and the SU 86B.

The memory 88 is, for example, a semiconductor memory, and includes a read only memory (ROM) area and a random access memory (RAM) area.

The SU 86 includes the configuration of the CM 22 and the DE 23 of the embodiment 1, although this is not illustrated in FIG. 16. WSVs are configured in areas of disks of the SU 86A and the SU 86B.

The storage system according to embodiment 3 has the same configuration as that illustrated in FIG. 4. However, the functions of the detection unit 33, the prefetch control unit 34, and the communication unit 36 are provided by the CPU 87 instead of a CPU (not illustrated) in the SU. Also, the function of the storage unit 35 is provided by the memory 88 instead of a memory (not illustrated) in the SU.

It was described above that the cache 31 is implemented by a cache (not illustrated) of the SU 86; however, it is also possible to implement the cache 31 by providing a cache memory in the PU 84 and using the cache memory in the PU. Also, it was described above that the cache control unit 32 is implemented by a CPU (not illustrated) in the SU 86; however, it may be implemented by the CPU 87.

According to the control device according to the present embodiment, it is possible to reduce communication loads between control devices when a read request is made to a storage system.

Note that the present embodiment is not limited to the embodiment described above, and various configurations or embodiments can be employed without departing from the spirit of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device that controls a reading process of information stored in a first unit storage area of a first storage device under control of the control device and a second unit storage area of the second storage device under control of a different control device in a distributed manner, the control device comprising:
- a communication unit that communicates with the different control device;
- a memory that stores boundary information indicating an address of a boundary of the first storage area; and
- a processor that executes a procedure including:
    - receiving a process request to request the reading process on the information stored in the first unit storage area and the second unit storage area in a distributed manner,
    - determining, according to the received process request, whether or not the reading process includes a sequential reading process that reads information stored in the first unit storage area under control of the control device in an order of logical addresses,
    - determining, when the reading process is determined to include the sequential reading process, whether or not a reading target area of the sequential reading process includes the address of the boundary of the first unit storage area by using the boundary information,
    - performing prefetch of reading, beforehand, information of the first unit storage area related to the sequential reading process determined to include the sequential reading process and storing the information in a cache memory, and
    - reporting, when the reading target area of the sequential reading process is determined to include the address of the boundary of the first unit storage area, via the communication unit, to the different control device control information related to the sequential reading process including the address of the boundary of the first unit storage area.

2. The control device according to claim 1, the procedure further including: determining whether or not a reading process of the first unit storage area and a reading process of a control device as a reporting source include the sequential reading processes on the basis of the control information reported from the different control device.

3. The control device according to claim 2, the procedure further including:
- measuring a number of times of reading in the order of logical addresses in the sequential reading process, wherein
- the reporting reports the measured number of times to the different control device when a reading target area of the reading process includes the address of the boundary of the first unit storage area, and
- the performing performs the prefetch when a value obtained by adding the reported number of times to a number of times of reading in the order of logical addresses in the control device is equal to or greater than a prescribed threshold.

4. The control device according to claim 1,
- wherein the memory stores an amount of information for information to be read by the prefetch,
- wherein the procedure further includes:
    - determining whether or not a prefetch target area to be read by the prefetch includes the second unit storage area on the basis of the information amount; and
    - reporting to the different control device prefetch information related to the second unit storage area when it has been determined that the prefetch target area includes the second unit storage area,
- wherein when the prefetch information has been reported from a different control device, the performing performs the prefetch of information in a unit storage area corresponding to the prefetch information on the basis of the reported prefetch information.

5. A storage system that performs a reading process of information stored in a first unit storage area of a first storage device under control of a first control device and a second unit storage area of a second storage device under control of a second control device in a distributed manner, wherein the first control device comprises:
- a communication unit that communicates with the second control device;
- a memory that stores boundary information indicating an address of a boundary of the first storage area; and
- a processor that executes a first procedure including:
    - receiving a process request to request the reading process on the information stored in the first unit storage area and the second unit storage area in a distributed manner,
    - determining, according to the received process request, whether or not the reading process includes a sequential reading process that reads information stored in the first unit storage area under control of a first control device in an order of logical addresses,
    - determining, when the reading process is determined to include the sequential reading process, whether or not a reading target area of the sequential reading process includes the address of the boundary of the first unit storage area; and
    - reporting, when the reading target area of the sequential reading process is determined to include the address of the boundary of the first unit storage area, via the communication unit, to the second control device control information related to a sequential reading process including the address of the boundary of the firs unit storage area and
- the second control device comprises a processor that executes a second procedure including:
    - determining whether or not a reading process of the second unit storage area under control of a second control device and a reading process of a first control device as a reporting source including the sequential reading processes on the basis of the control information reported from the first control device; and
    - performing prefetch of reading, beforehand, information of the second unit storage area under control of a second control device related to the sequential reading process determined to include the sequential reading process and storing the information in a cache memory.

6. The storage system according to claim 5,
- wherein the first procedure further includes: measuring a number of times of reading in the order of logical addresses in the sequential reading process,
- wherein
- the reporting reports the measured number of times to the second control device when a reading target area of the reading process includes a last address in a unit storage area under control of the first control device, and
- the performing performs the prefetch when a value obtained by adding the reported number of times to a number of times of reading in the order of logical addresses in the second control device is equal to or greater than a prescribed threshold.

7. The storage system according to claim 5, wherein
the memory in the first control device stores an amount of information for information to be read by the prefetch, and
the first procedure further includes:
determining whether or not a prefetch target area to be read by the prefetch includes the second unit storage area under control of the second control device on the basis of the information amount; and
reporting to the second control device prefetch information related to the second unit storage area when it has been determined that the prefetch target area includes the second unit storage area under control of the second control device,
wherein when the prefetch information has been reported from the first control device, the performing performs the prefetch of information in the second unit storage area corresponding to the prefetch information on the basis of the reported prefetch information.

8. The storage system according to claim 5, wherein
the storage system includes a plurality of storage devices that are connected between housings, and
each of the storage devices includes, in the housing, a storage unit that includes a storage device group that assigns the unit storage area and a control unit that controls the storage device group, and a control unit that operates as the first and second control devices.

9. The storage system according to claim 8, wherein the control unit is a server provided in the housing, and performs an input/output process for the storage unit of a different storage device connected between housings.

10. A non-transitory computer-readable recording medium having stored therein a program for causing a computer to execute a process of controlling a reading process of information stored in first unit storage area of a first storage device under control of a control device itself and a second unit storage area of a second storage device under control of a different control device in a distributed manner, the process comprising:
receiving a process request to request the reading process on the information stored in the first unit storage area and the second unit storage area in a distributed manner;
determining, according to the received process request, whether or not the reading process includes a sequential reading process that reads information stored in the first unit storage area under control of the control device itself in an order of logical addresses;
determining, when the reading process is determined to include the sequential reading process, whether or not a reading target area of the sequential reading process includes the address of the boundary of the first unit storage area;
performing prefetch of reading, beforehand, information of the firs unit storage area related to the sequential reading process determine to include the sequential reading process and storing the information in a cache memory; and
reporting, when the reading target area of the sequential reading process is determined to include the address of the boundary of the first unit storage area, via a communication unit that communicates with the different control device, to the different control device control information related to the sequential reading process including the determined address of the boundary of the first unit storage area.

11. The non-transitory computer-readable recording medium according to claim 10, the process further comprising:
measuring a number of times of reading in the order of logical addresses in the sequential reading process, wherein
the reporting reports the measured number of times to the different control device when a reading target area of the reading process includes the address of the boundary of the first unit storage area.

12. The non-transitory computer-readable recording medium according to claim 11, the process further comprising:
determining whether or not a prefetch target area to be read by the prefetch includes the second unit storage area on the basis of an amount of information for information, stored in a memory, to be read by prefetch; and
reporting to the different control device prefetch information related to the second unit storage area when it has been determined that the prefetch target area includes the second unit storage area.

13. A non-transitory computer-readable recording medium having stored therein a program for causing a computer to execute a process of controlling a reading process of information stored in a first unit storage area of a first storage device under control of a control device itself and a second unit storage area of a second storage device under control of a different control device in a distributed manner, the process comprising:
determining whether or not a reading process of the first unit storage area and a reading process of a control device as a reporting source including sequential reading processes on the basis of control information that includes an address of a boundary of the first unit storage area of a reading target area of a sequential reading process of reading information stored in the second unit storage area under control of the different control unit in an order of logical addresses and that is related to a sequential reading process reported from the different control device via a communication unit that communicates with the different control device; and
performing prefetch of reading, beforehand, information of the first unit storage area under control of a control device itself related to the determined sequential reading process and storing the information in a cache memory.

14. The non-transitory computer-readable recording medium according to claim 13, wherein the performing performs the prefetch when a value obtained by adding the number of times of reading in an order of logical addresses in the sequential reading process of the different control device to a number of times of reading in an order of logical addresses in a control device itself is equal to or greater than a prescribed threshold.

15. The non-transitory computer-readable recording medium according to claim 14, wherein the performing performs the prefetch of information in a unit storage area corresponding to the prefetch information on the basis of the prefetch information, reported from the different control device, related to a unit storage area under control of a control device itself.

* * * * *